C. W. LARNER.
TAPER PLUG VALVE.
APPLICATION FILED JAN. 22, 1918.
1,314,341.
Patented Aug. 26, 1919.
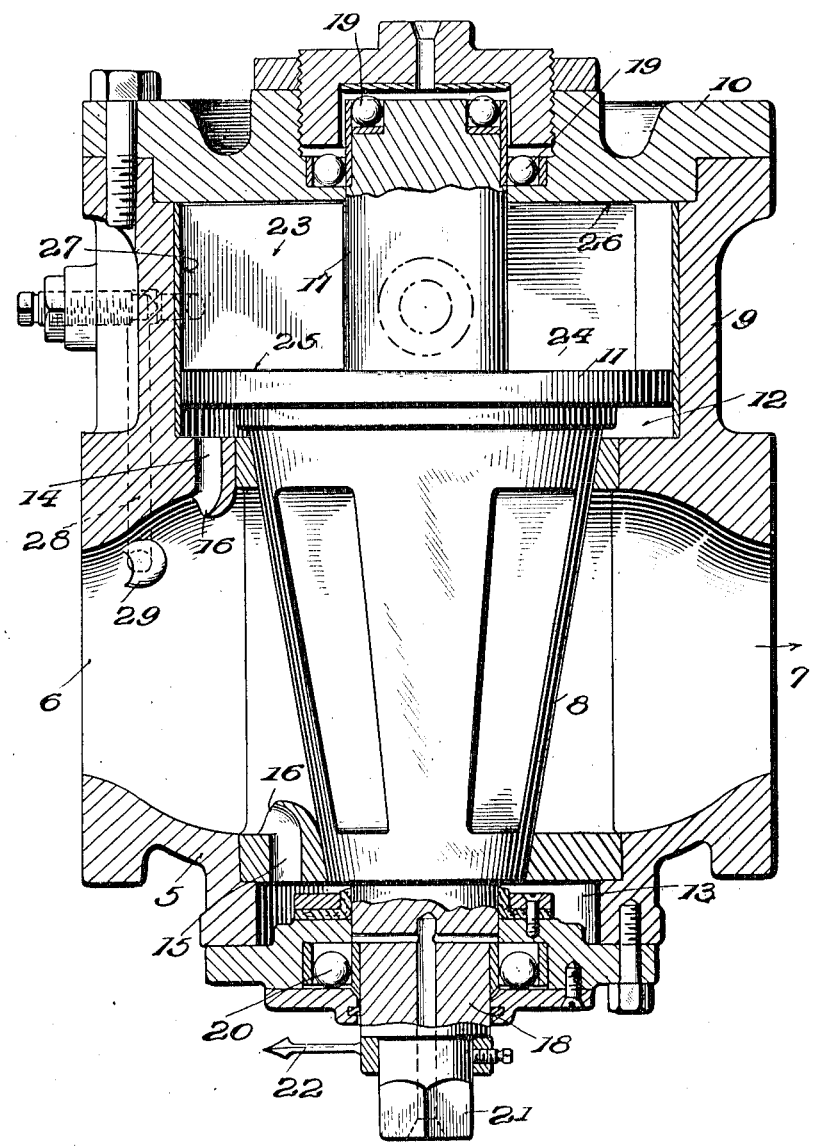
Inventor
Chester W. Larner.
By A. B. Stoughton
Attorney.

UNITED STATES PATENT OFFICE.

CHESTER W. LARNER, OF PHILADELPHIA, PENNSYLVANIA.

TAPER-PLUG VALVE.

1,314,341.   Specification of Letters Patent.   Patented Aug. 26, 1919.

Application filed January 22, 1918. Serial No. 213,172.

*To all whom it may concern:*

Be it known that I, CHESTER W. LARNER, a citizen of the United States, residing at Philadelphia, in the county of Phialdelphia and State of Pennsylvania, have invented certain new and useful Improvements in Taper-Plug Valves, of which the following is a specification.

In my co-pending application, Ser. No. 189,532, filed Sept. 4, 1917, patented April 23, 1918, No. 1,263,778, there is shown and described a taper plug valve provided with operating chambers for relieving the wedging action of the plug, for effecting the turning of the plug, and for re-wedging it. The various connections which transmit pressure to said chambers are ordinary straight connections without any deflecting means so that when the velocity through the valve is high the pressure in the operating chambers will be low. In fact, if the valve is at the end of a line discharging to atmosphere, or if the line beyond the valve is empty at the time the valve is opened, the velocity through the valve will be practically spouting velocity. Otherwise stated, all the head would be in velocity and there would be no pressure head, consequently there would not be enough pressure in the operating chambers to operate the plug.

One of the principal objects of this invention is to provide means for catching the flow of water or other fluid so as to produce a pressure in the operating chambers which is approximately the total head on the valve.

Another object is to provide means for holding the plug in a central position when it lifts previous to turning and to reduce friction in turning, and to provide an unbalanced area at the smaller end of the plug so as to make it seat more tightly.

With such and other objects in view, the nature, characteristic features and scope of the invention will more readily be understood from the following description taken in connection with the accompanying drawing, which is a view principally in central vertical section of a plug valve embodying my improvements.

The valve shown is a four-way valve, but the improvements are equally applicable to multiple and straight-way valves. 5 is its shell or casing having supply and exhaust passages 6 and 7 and complemental outlets controlled by a taper plug 8, which has a wedge fit in the plug bore of the casing.

The valve casing is provided with an upwardly directed cylindrical extension 9, which together with its cap 10 forms a chamber for fluid pressure. The large end of the plug is provided with a flange or collar 11, which divides said chamber into upper and lower compartments, whereof the lower compartment or chamber 12 receives pressure for plug balancing and lifting purposes. Below the plug there is a pressure balancing chamber 13. The chambers 12 and 13 communicate with the supply end of the valve by means of ports 14 and 15, the inlet ends of which are provided with lips or scoop like extensions 16, which operate to catch the flow of the water or other fluid and produce a pressure in the operating chambers, which is substantially the total head on the valve. The provision of the deflecting elements 16, or their equivalent, is important because without such provision the pressure in the operating chambers would be simply the pressure head and the velocity head would be lost and, consequently, when the valve is opened and flow takes place into an empty pipe line the velocity through the valve would be, practically, spouting velocity and there would be little or no pressure in the operating chambers.

The plug 8 is formed or provided with endwise directed stems or projections 17 and 18, which constitute journals and are carried in antifriction bearings 19 and 20 accommodated in the valve casing. The advantage of this construction and arrangement is that the plug is held in a central position when it lifts previous to turning and turns freely instead of riding against one side of the bore as it would if the bearings are omitted. Moreover, the presence of the bottom stem 18 provides an unbalanced area which gives the plug a more positive seating tendency. The stem 18 protrudes from the valve casing and has a wrench head 21 to facilitate the turning of the plug by hand if necessary or desirable. It may also carry an indicator 22, which, when present, is useful in ascertaining the position of the plug with relation to the ports.

As fully pointed out in my prior application, the cap 10 is provided with a depending radial partition, wing or abutment 23, and the collar or flange 11 is provided with a corresponding upstanding wing or abutment 24. The abutment 23 on the cap is of course stationary since the cap is secured to the valve casing. The abutment 24 is movable in response to pressure and of course carries the plug with it. Each abutment is provided with a clearance, indicated at 25 and 26, so as to enable the plug to rise slightly from its fit in the taper bore and making it easy to turn.

The manner of operating the abutment 24 is fully disclosed in my application aforementioned and requires no further explanation here other than to say that the operating chambers 27 at each side of the fixed abutment communicate with the supply passage 6 through the medium of ports 28, the inlets of which have means, such as the lips or scoop like formations 29, for catching the flow of fluid.

Other than as herein described, the construction, arrangement and assemblage of parts, and the mode of operation of the valve, are or may be the same as in my prior application.

Having described the nature and objects of the invention, I claim:—

1. In a taper plug valve, the combination of a casing having bearings disposed at the ends of a taper bore provided in the casing, a taper plug having endwise projecting journals freely slidable and turnable in said bearings for centering the plug when freed from the taper bore, and means independent of the bearings for freeing the plug from the bore and for turning it, substantially as described.

2. In taper plug valve, the combination with the plug, of a casing provided with operating chambers for operating the plug, and ports connecting said chamber with the supply passage of the valve and having their inlets provided with scoop-like extensions projecting into the path of fluid flow, substantially as described.

In testimony whereof I affix my signature.

CHESTER W. LARNER.